Figure 1:
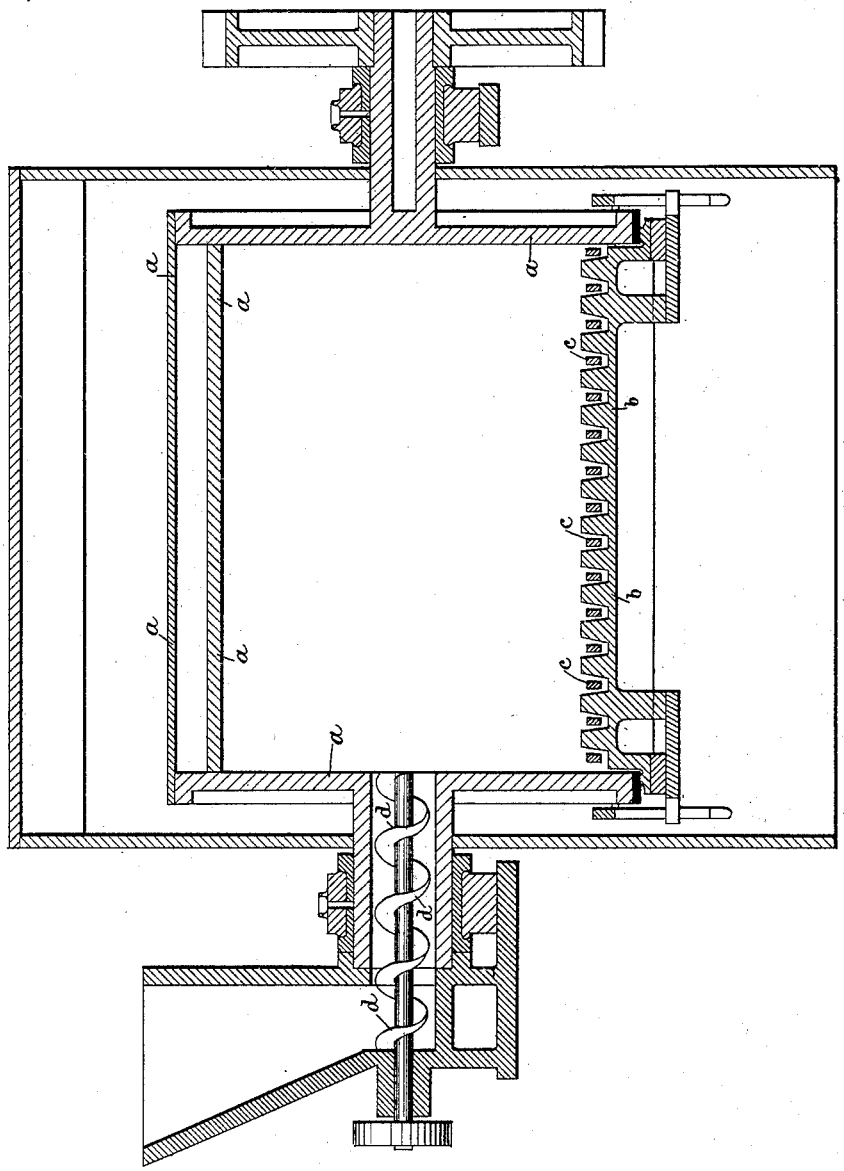

(No Model.) 3 Sheets—Sheet 2.

R. BOSSE, E. FRIESE & F. WOLTERS.
HYDRAULIC AND OTHER CEMENT.

No. 375,599. Patented Dec. 27, 1887.

Witnesses Inventors:

(No Model.) 3 Sheets—Sheet 3.
R. BOSSE, E. FRIESE & F. WOLTERS.
HYDRAULIC AND OTHER CEMENT.
No. 375,599. Patented Dec. 27, 1887.
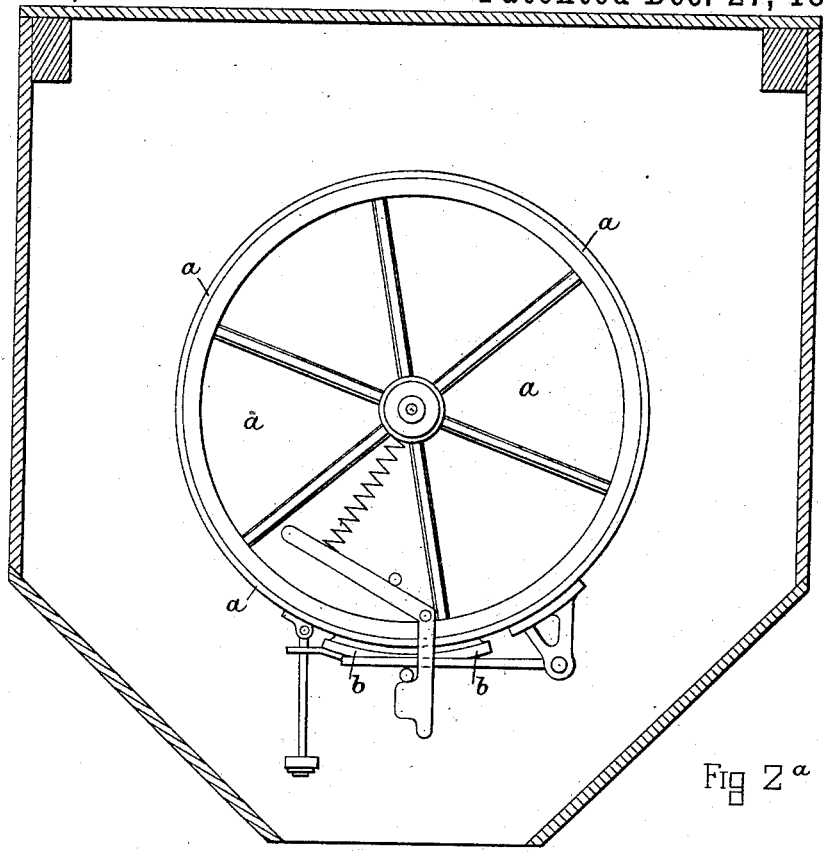
Fig 2ᵃ
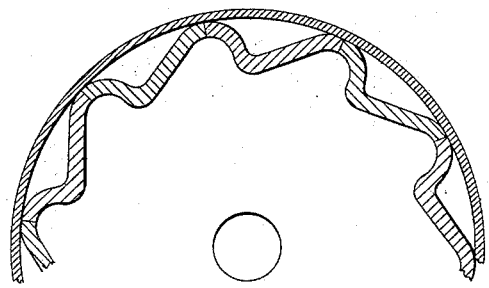
Fig 4
Witnesses
James F. DuHamel
Walter S. Dodge
Inventors:
Robert Bosse,
Edward Friese,
Franz Wolters,
by Dodge & Son,
Associate Attys.

UNITED STATES PATENT OFFICE.

ROBERT BOSSE, EDUARD FREISE, AND FRANZ WOLTERS, OF BRUNSWICK, GERMANY.

HYDRAULIC AND OTHER CEMENT.

SPECIFICATION forming part of Letters Patent No. 375,599, dated December 27, 1887.

Application filed July 21, 1886. Serial No. 208,607. (No model.) Patented in England January 10, 1883, No. 152, and July 6, 1885, No. 8,153; in France January 10, 1883, No. 153,030, and July 3, 1885, No. 169,927; in Belgium January 12, 1883, No. 60,138, and July 4, 1885, No. 69,493, and in Luxemburg February 9, 1886.

*To all whom it may concern:*

Be it known that we, ROBERT BOSSE, EDUARD FREISE, and FRANZ WOLTERS, subjects of the Emperor of Germany, residing at Brunswick, in the Empire of Germany, have invented certain new and useful Improvements in Hydraulic and other Cements, (for which we have received Letters Patent in England, dated January 10, 1883, No. 152, and July 6, 1885, No. 8,153,) of which the following is a specification.

This invention has for its object the manufacture of a cement equal or superior in hydraulic qualities and impermeability to Roman, Portland, or other cements now in use, and absolutely free from the dangerous "blowing" qualities so often found in other calcined cements, and at the same time cheaper to make, and formed in part of otherwise waste materials. Blast-furnace or other slag formed in large part of silicates of alumina and lime is run while hot into water. Those slags are to be preferred for this purpose which, when so treated, will fall into granules which present a vitreous aspect. To this slag sand slaked lime with, or without silicic acid, is added, as required.

The relative quantities of slag and lime employed are decided by an analysis of a cement (say Portland cement) which it is desired to produce—that is to say, having analyzed chemically the slags and the slaked lime, such selection from these is made as will, when combined, render the composition of the mixture similar to that of the cement which it is desired to produce. If a cement is wanted to be exposed to air only, the proportions of alumina may conveniently be brought to about eleven per cent.; but for more hydraulic cement the proportion of alumina may be brought to sixteen per cent. and more. In that case alumina may be added, if not found sufficiently in the raw materials employed. If a cement is wanted of great hardness, the proportion of silicious compounds in the mixture is increased, and this may be carried to thirty-three per cent. of silex. Soluble silicious acid may in that case be added to the mixture. The proportions of the lime in the mixture may also be made larger than that in a Portland cement. By such excess of lime a very adhesive cement is obtained; but this excess of lime will impair the strength in other respects of the mixture employed as a cement. Cement manufactured in this manner is, however, not so strictly limited to certain exact proportions of the different ingredients as Portland cement. The lime is slaked with water and allowed to fall into powder, by which means all danger of blowing later on is avoided, and may even be left for a time—say eight to ten days—after being slaked, for the result is not impaired even if small quantities of carbonic acid have combined with the caustic lime.

Besides alumina, silicic acid, and lime, other ingredients may be added now used by manufacturers of hydraulic cement for improving its qualities for given purposes. Artificial stone may be manufactured by using this cement in the way known already.

An example is now given of the manner in which a choice is made of matters for obtaining the proper mixture: Supposing there is a furnace-slag, No. I, containing 50.6 $CaO$, 33 $SiO_2$, 9.8 $Al_2O_3$, 6.6 matters without importance for the purpose, and another furnace-slag containing 48.2 $CaO$, 27.2 $SiO_2$, 21.5 $Al_2O_3$, 3.1 matters without importance for the purpose, and lime containing 74.0 $CaO$, 23 $H_2O$, water forming the hydrate of lime, 3 matters without importance for the purpose. In this case is taken one hundred and fourteen parts of slag No. I, one hundred and fourteen parts of slag No. II, and seventy-nine parts of the lime. This brings into the mixture of the three ingredients by slag I 57.7 $CaO$, 37.8 $SiO_2$, 11.1 $Al_2O_3$, 7.5 indifferent; by slag II, 54.9 $CaO$, 31.0 $SiO_2$, 24.5 $Al_2O_3$, 3.5 indifferent; by the lime, 58.5 $CaO$, 2.4 indifferent.

If the whole of the mixture be reduced to one hundred parts, there will be in a hundred parts of mixture 60 $CaO$, 24 $SiO_2$, 12.3 $Al_2O_3$, 3.7 indifferent—a proportion of ingredients corresponding to that of a Portland cement of highly-hydraulic properties. If, instead of this proportion of ingredients, a larger quantity of slag II had been employed, there would have been more argillaceous matter in the mixture, and it would have been more hydraulic still.

If slag I had been employed in larger proportion, the silex would predominate and the resulting cement would have been stronger. An addition of lime would have rendered the cement more adhesive, but would make it lose some of its cohesive strength. This shows that all kinds of cement may be obtained by this system of combining ingredients. The indifferent or foreign matter which accompanies the slag and the lime exercises no influence on the final result. It ought only to be taken account of when calculating the proportions of the mixture. While granulated slag-sand only has been mentioned, this being the cheapest material obtainable, other double silicates of alumina and lime, and indeed other slag than that described, will, worked and combined in the manner and proportions herein described, fulfill the purposes required to a greater or less extent; but none for cheapness and efficiency are to be compared to the slag-sand described.

The ingredients in the mixture must be in a very dry fine powder and preferably well sifted, and the cement is obtained by intimately mixing the same, but without subsequent burning or calcining of the mixture. The grinding can be done by any means now used for the grinding of Portland cement—as stones, rollers, &c.—and the sifting and mixing likewise by any ordinary machines suitable for such purposes; but it has been found that a vastly superior article can be made by a supplementary or finishing treatment by means of a ball-mill, and this method of making cements more thoroughly hydraulic by finishing with a ball-mill grinding enormously improves the value also of cements made from other materials than those described herein. Consequently, even when ordinary grinding is used, it is finished up by grinding in a ball-mill. By a "ball-mill" is meant a hollow vessel mounted in a horizontal or inclined position on horizontal, or it might be somewhat inclined, pivots or rollers; so that it can be rotated.

The hollow vessel may be spherical, cylindrical, oval, polygonal, or of other form, so long as it is so constructed that the balls placed in the interior will, when the vessel is rotated, be carried upward, and then allowed to drop.

Figure 2:
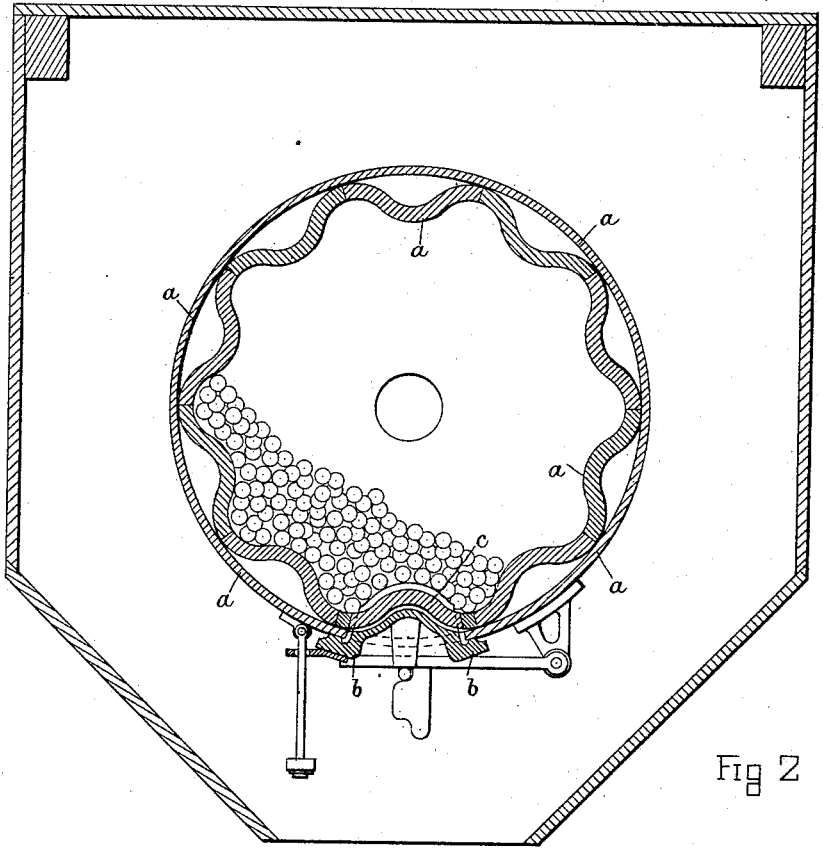
Figure 3:
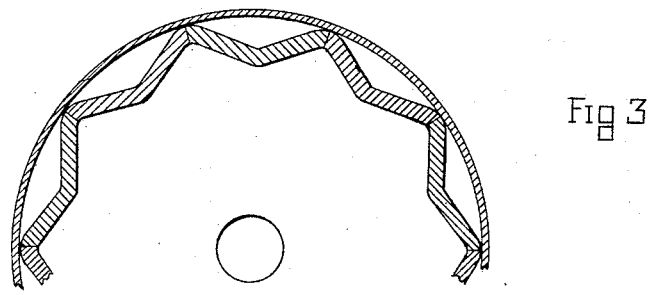

Figure 1 of the drawings hereunto annexed shows a longitudinal section of the revolving vessel, hereinafter called the "drum" of a ball-mill such as is preferably employed. Figs. 2, 3, and 4 show alternative forms to which the interior of the drum may advantageously be shaped in cross-section.

$a$ is the drum, which on the inside is supplied with deep corrugations.

$b$ is the lid or cover, which, by means of levers or otherwise, can be opened and again tightly closed while the machine is constantly revolving.

$c$ is a grate stationarily fixed under the cover, which will retain the balls, but pass the material.

$d$ is a worm or screw fitted in one of the hollow pivots, by means of which the material is introduced into the machine.

The drum might be made circular in cross-section on the inside; but preferably a drum is used which on the inside is formed into more or less regular waves or corrugations, such as shown at Figs. 2, 3, and 4. The object of this is to cause the balls and material to be raised farther by the rotation of the drum before they are allowed to drop, so that they may fall down with a longer drop and better effect. The same effect might be arrived at in other ways—as, for example, by mounting the drum eccentrically on a horizontal axis or otherwise, but scarcely so effectually and practically.

The drum is partially filled with numerous balls. These balls can be made of any hard durable material—such as chilled iron, steel, iron stone, &c.; but chilled iron is preferred on account of its cheapness and durability. The balls need not of necessity be round, but it is preferable that they should be, because as circular balls only come into contact at points the intense pressures or impacts between the balls will be greatest when they are of a circular form.

The material to be treated is to a certain extent reduced prior to its being introduced into the ball-mill by grinding or other machines, which are better adapted than ball-mills for mere grinding purposes, as the balls in the ball-mill would not commence to produce the desired effect until the cement had been reduced to a comparatively fine state of division. As, also, the matter is reduced to a fine state of division before being placed into the ball-mill, it is preferred to place into the drum of the mill a large number of comparatively small balls—say from two inches downward—so as to obtain very numerous blows rather than few heavy ones.

The number of balls to be introduced naturally depends upon the size of the drum. In practice it has been found advantageous to use about one part in weight of balls to one part of material, and to fill from one-third to one-half of the whole contents of the drum with a mixture of the two; but other proportions might be used.

The drum may be of any desired size; but it has been found that drums of from three feet to six feet in diameter give good results. The speed of rotation of the drum will naturally depend upon its diameter. The best speed is that which gives the greatest number of blows; but care must be taken that the drum is not run so quickly that the centrifugal force prevents the balls and material from dropping. This ball-mill has been very fully described as being the simplest and best machine for the manifold purposes to be arrived at; but other machines giving a combined stamping, incorporating, and abrading effect—such, for instance, as a set of stamps which are caused to rotate as they strike, and thus pound and grind at the same time—will have some of the desired effects.

The compound cement or the simple cement or material—such as Portland or Roman cement—or a mixture of such like materials, which is to be treated, after being first ground in any ordinary manner to the required degree of fineness, (preferably about as fine as ordinary Portland cement is now commonly used,) is passed into the drum. The opening is securely closed by a tight-fitting cover and the drum is rotated so that the balls and material are jerked about within the interior, and in this way the cement is subjected to a continuous succession of numberless blows or intense pressures, and a continuous rubbing and grinding from the continued impact of the balls until, first, the cement is reduced to a degree of fineness which by any ordinary mode of grinding it is very difficult to arrive at, and, secondly and chiefly, the granules of the cement get so broken down that the cement loses its granular sharp structure and becomes soft, silky, greasy to the touch, and the particles of the different substances become compressed, incorporated, and intimately mixed, and are made to penetrate in among one another in a manner never yet arrived at nor obtained by mechanical means.

The length of time for which it is desirable and necessary to subject the cement to the pounding action varies with the kind and nature of the material to be treated and with the size and effect of the machine and the filling it contains. The object of the operation to be attained in all cases is, however, as just stated, the reduction of the materials to the condition above referred to, and the operation should be continued until this is substantially attained. The longer the pounding the better the effect. Ordinarily it has been found advantageous to treat the cement in the pounding-mill for about one hour.

The whole of the material of one mixture should be left in the mill until, as far as possible, every particle has been squeezed or pounded and the different ingredients thoroughly mixed and incorporated. The lid or cover can then be taken off the opening and the powdered cement run off through it, or by any other practical means emptied, the drum being rotated while this is going on, so as to separate the cement from the balls.

When the slags are employed in granulated form and are for the most part reduced to a state resembling coarse sand by the granulating process, the grinding of such sand prior to introducing it into the ball-mill is not absolutely essential, although even in this case it is desirable to do so, in order to shorten the time that it would have to be acted upon by the ball-mill, as also to secure a more even product by foregoing sifting. The lime also will have been brought to a powdered state by the slaking process.

In all cements the various matters of which the cement is composed are chemically separated the one from the other, although in the case of calcined cements they are brought very closely into contact by the calcining, yet nevertheless, even in this case, closer contact of the elementary bodies or matters is increased and irregularities in previous burning and mixing equalized by the subsequent above-described mechanical action only obtainable by pounding or stamping and this intimate incorporation.

In the case of cements composed of an admixture of slags and slaked lime the slags and lime are brought by the pounding action into such close and intimate contact that the cement thereby produced, although the different materials of which it is composed have not been calcined together, is in every respect equal or even superior to Portland cement made in the ordinary manner.

In proof of the above assertions, a few facts will be mentioned proving the difference in the nature of cement treated in the above manner, which will hereinafter be called "pounded," compared with cements not so treated, which will be called "unpounded." (a.) Pounded cement made from slags and slaked lime will be found heavier and less bulky than unpounded cement of same fineness, owing to the compression and incorporation which has been produced. (b.) Pounded cement when tempered with water will generally be found to heat several degrees higher than the same cement unpounded, showing that the chemical and physical binding process caused by the addition of the water is taking place quicker and more intensely. (c.) Slow-setting cement is by the pounding rendered more quick setting still without getting the bad qualities generally attending a quick-setting cement—for example, a good strength at first, but no power of subsequently much increasing the strength. (d.) Residues sifted from pounded cement are not so sharp and granular as from unpounded. (e.) Pounded cement is greasy, floury, soft, and silky to the touch, whereas unpounded cement is sandy and granular. (f.) The hydraulic qualities of pounded cement are astonishing. A few minutes after such cement has been tempered with water and formed into a ball or other similar shape it will, although still quite soft and slow setting, keep its outward shape when put into water, whereas ordinary slow-setting cement will never stand this test. (g.) Pounded cement, when examined by forcing water under a certain pressure through small blocks formed from it, shows only one two-hundredth to one three-hundredth part of water pressed through the pounded cement that would be pressed through similar blocks made from unpounded cement under the same pressure. (h.) All cements, even already dust fine, are increased in strength for tension, adhesion, and compression in many cases from forty per cent. to sixty per cent. by the pounding, showing that this and not the fineness of the cement is the reason of the improvements. (i.) The effect of the pounding is still more astonishing with compound cements, chiefly such as have lime added to them. It is well known that lime can be added to cement to render it cheaper, but that the cement is thereby rendered weaker, whereas cement with slaked lime in a suitable proportion added and afterward pounded will be increased in quantity while retaining all its valuable qualities, showing how closely the lime gets admixed with and is made to permeate among the particles of the cement by the pounding and incorporating. (j.) Pounded cement is much more plastic and easy to work and yields a flat and rich mortar, whereas unpounded cement is very meager and has a short break.

We are aware that in British Patent No. 2,148 of 1862 it has been proposed to make slag-sand by slaking hot slag in water, and that in British Patent No. 1,970 of 1866 it has been proposed to mix slaked lime with ground slag, the ingredients of which have been specially fused together, but which have not been slaked in water, and we make no claim to either of these processes *per se.*

Without slaking the slag in water and securing the molecular disintegration caused thereby slag is useless for cement purposes, and, so far as we are aware, we are the first to produce a cement composed of slag thus broken down and mixed in a finely-comminuted condition with dry-slaked lime.

We declare that what we claim is—

1. A hydraulic cement composed of blast-furnace or other slag reduced to granular form, sand, and slaked lime, in substantially the proportions stated, with or without silicic acid.

2. The process of making hydraulic cement, which consists in slaking hot slag, such as described, in water, taking a mixture of the granulated and dried result, with or without previous grinding and sifting, slaked lime, and silicic acid, if required, in the chemical proportions requisite to produce cement, and submitting the mixture to a supplementary or finishing treatment in a ball-mill or a machine with a similar action and effect, but without further calcination, substantially as described.

3. The process of making hydraulic cement, which consists in mixing slags—dried, ground, and sifted—with slaked lime and silicic acid, if required, in the chemical proportions requisite to produce cement, and submitting the mixture to a supplementary or finishing treatment in a ball-mill or a machine with a similar action and effect, but without further calcination, substantially as described.

4. The improvement in the process of manufacturing hydraulic cement, which consists in pouring hot slag, such as described, into water, and drying, finely grinding, sifting, and mixing the resultant with slaked lime and with silica, if required, without further calcination, substantially as described.

5. The improvement in the process of making hydraulic cement, which consists in taking combined silicic acid, alumina, and slaked lime, in the proportions requisite to form hydraulic cement, mixing and grinding the same, and submitting them to a further pounding and rubbing and incorporating action, substantially in the manner described.

6. The improvement in the process of making cements hydraulic or more hydraulic and increasing their strength and other valuable qualities, which consists in taking the ground cement and submitting it to a supplementary grinding and pounding, such as described, whereby the particles are broken down, and acquire a fine silky soft structure and other valuable qualities, substantially as described.

7. The method of rendering hydraulic or more hydraulic compound or other cements by a supplementary or finishing, grinding, or pounding in ball-mills, whereby the ground product is compressed, the elementary bodies brought into close contact, and the granules broken down and brought into a fine, floury, greasy, silky, soft, lamellar state.

In testimony whereof we have signed our names to this specification in the presence of two subscribing witnesses.

R. BOSSE.
E. FREISE.
FRANZ WOLTERS.

Witnesses:
A. HOHANZ,
HEINR. VOGES.